United States Patent [19]

Takeo

[11] Patent Number: 5,187,752
[45] Date of Patent: Feb. 16, 1993

[54] METHOD FOR DETERMINING IMAGE POINTS IN OBJECT IMAGES

[75] Inventor: Hideya Takeo, Kanagawa, Japan

[73] Assignee: Fuji Photo Film Co., Ltd., Kanagawa, Japan

[21] Appl. No.: 507,423

[22] Filed: Apr. 10, 1990

[30] Foreign Application Priority Data

Apr. 14, 1989 [JP] Japan .................................. 1-94909

[51] Int. Cl.$^5$ .............................................. G06K 9/00
[52] U.S. Cl. ...................................... 382/41; 382/48; 350/327.2
[58] Field of Search ............... 382/41, 48, 45, 28, 382/18, 51, 50; 356/11, 21; 358/107; 250/327.2; 364/413.17, 463

[56] References Cited

U.S. PATENT DOCUMENTS

| | | | |
|---|---|---|---|
| 4,258,264 | 3/1981 | Kotera et al. | 250/484 |
| 4,276,473 | 6/1981 | Kato et al. | 250/327.1 |
| 4,315,318 | 2/1982 | Kato et al. | 364/515 |
| 4,387,428 | 6/1983 | Ishida et al. | 364/414 |
| 4,516,263 | 5/1985 | Dew et al. | 382/41 |
| 4,527,060 | 7/1985 | Suzuki et al. | 250/327.2 |
| 4,682,028 | 7/1987 | Tanaka et al. | 250/327.2 |
| 4,983,835 | 1/1991 | Takeo | 250/327.2 |

FOREIGN PATENT DOCUMENTS 56-11395 2/1981 Japan .

Primary Examiner—Herbert Goldstein
Assistant Examiner—Yon Jung
Attorney, Agent, or Firm—Sughrue, Mion, Zinn, Macpeak & Seas

[57] ABSTRACT

A method for determining an image point in an object image composed of the steps of detecting an image signal made up of a series of image signal components representing respective picture elements in a radiation image, which includes an object image and which has been recorded on a recording medium. The center of gravity of the object on the recording medium is found from the image signal by weighting the respective picture elements with corresponding absolute values of differentiated values resulting from the carrying out of differentiation processing on the image signal values corresponding to the respective picture elements. A position, at which the center of gravity is located, is determined as the image point in the object image.

16 Claims, 6 Drawing Sheets

METHOD FOR DETERMINING IMAGE POINTS IN OBJECT IMAGES

BACKGROUND OF THE INVENTION

1. Field of the Invention

This invention relates to a method for determining an image point in an object image on the basis of an image signal comprising image signal components representing image information at respective picture elements on a recording medium on which a radiation image including the object image has been recorded.

2. Description of the Prior Art

Techniques for reading out a recorded radiation image in order to obtain an image signal, carrying out appropriate image processing on the image signal, and then reproducing a visible image by use of the processed image signal have heretofore been known in various fields. For example, as disclosed in Japanese Patent Publication No. 61(1986)-5193, an X-ray image is recorded on an X-ray film having a small gamma value chosen according to the type of image processing to be carried out, the X-ray image is read out from the X-ray film and converted into an electric signal, and the electric signal (image signal) is processed and then used for reproducing the X-ray image as a visible image on a copy photograph or the like. In this manner, a visible image having good image quality with high contrast, high sharpness, high graininess, or the like can be reproduced.

Also, when certain kinds of phosphors are exposed to radiation such as X-rays, $\alpha$-rays, $\beta$-rays, $\gamma$-rays, cathode rays or ultraviolet rays, they store part of the energy of the radiation. Then, when the phosphor which has been exposed to the radiation is exposed to stimulating rays such as visible light, light is emitted by the phosphor in proportion to the amount of energy stored thereon during its exposure to the radiation. A phosphor exhibiting such properties is referred to as a stimulable phosphor. As disclosed in U.S. Pat. Nos. 4,258,264, 4,276,473, 4,315,318, 4,387,428, and Japanese Unexamined Patent Publication No. 56(1981)-11395, it has been proposed to use stimulable phosphors in radiation image recording and reproducing systems. Specifically, a sheet provided with a layer of the stimulable phosphor (hereinafter referred to as a stimulable phosphor sheet) is first exposed to radiation which has passed through an object such as the human body in order to store a radiation image of the object thereon, and is then scanned with stimulating rays, such as a laser beam, which cause it to emit light in proportion to the amount of energy stored during exposure to the radiation. The light emitted by the stimulable phosphor sheet, upon stimulation thereof, is photoelectrically detected and converted into an electric image signal. The image signal is then used to reproduce the radiation image of the object as a visible image on a recording material such as photographic film, on a display device such as a cathode ray tube (CRT), or the like.

Radiation image recording and reproducing systems which use stimulable phosphor sheets are advantageous over conventional radiography using silver halide photographic materials, in that images can be recorded even when the energy intensity of the radiation to which the stimulable phosphor sheet is exposed varies over a wide range. More specifically, since the amount of light which the stimulable phosphor sheet emits when being stimulated varies over a wide range and is proportional to the amount of energy stored thereon during its exposure to the radiation, it is possible to obtain an image having a desirable density regardless of the energy intensity of the radiation to which the stimulable phosphor sheet was exposed. In order to obtain the desired image density, an appropriate read-out gain is set when the emitted light is being detected and converted into an electric signal to be used in the reproduction of a visible image on a recording material, such as photographic film, or on a display device, such as a CRT.

In order for an image signal to be detected accurately, certain factors which affect the image signal must be set in accordance with the dose of radiation delivered to the stimulable phosphor sheet and the like. Novel radiation image recording and reproducing systems which accurately detect an image signal have been proposed in, for example, U.S. Pat. No. 4,527,060. The proposed radiation image recording and reproducing systems are constituted such that a preliminary read-out operation (hereinafter simply referred to as the "preliminary readout") is carried out in order approximately to ascertain the radiation image stored on the stimulable phosphor sheet. In the preliminary readout, the stimulable phosphor sheet is scanned with a light beam having a comparatively low energy level, and a preliminary read-out image signal obtained during the preliminary readout is analyzed. Thereafter, a final read-out operation (hereinafter simply referred to as the "final readout") is carried out to obtain the image signal, which is to be used during the reproduction of a visible image. In the final readout, the stimulable phosphor sheet is scanned with a light beam having an energy level higher than the energy level of the light beam used in the preliminary readout, and the radiation image is read out with the factors affecting the image signal adjusted to appropriate values on the basis of the results of an analysis of the preliminary read-out image signal.

The term "read-out conditions" as used hereinafter means a group of various factors, which are adjustable and which affect the relationship between the amount of light emitted by the stimulable phosphor sheet during image readout and the output of a read out means. For example, the term "read out conditions" may refer to a read-out gain and a scale factor which define the relationship between the input to the read-out means and the output therefrom, or to the power of the stimulating rays used when the radiation image is read out.

The term "energy level of a light beam" as used herein means the level of energy of the light beam to which the stimulable phosphor sheet is exposed per unit area. In cases where the energy of the light emitted by the stimulable phosphor sheet depends on the wavelength of the irradiated light beam, i.e. the sensitivity of the stimulable phosphor sheet to the irradiated light beam depends upon the wavelength of the irradiated light beam, the term "energy level of a light beam" means the weighted energy level which is calculated by weighting the energy level of the light beam, to which the stimulable phosphor sheet is exposed per unit area, with the sensitivity of the stimulable phosphor sheet to the wavelength. In order to change the energy level of a light beam, light beams of different wavelengths may be used, the intensity of the light beam produced by a laser beam source or the like may be changed, or the intensity of the light beam may be changed by moving an ND filter or the like into and out of the optical path of the light beam. Alternatively, the diameter of the light beam may be changed in order to alter the scanning density, or the speed a which the stimulable phosphor sheet is scanned with the light beam ma be changed.

Regardless of whether the preliminary readout is or is not carried out, it has also been proposed to analyze the image signal (including the preliminary read-out image signal) obtained and to adjust the image processing conditions, which are to be used when the image signal is processed, on the basis of the results of an analysis of the image signal. The proposed method is applicable to cases where an image signal is obtained from a radiation image recorded on a recording medium such as conventional X-ray film, as well as to systems using stimulable phosphor sheets.

Various methods have been proposed for calculating how the read-out conditions for the final readout and/or the image processing conditions should be adjusted on the basis of an analysis of the image signal (including the preliminary read-out image signal). As one of such methods, it has been proposed in, for example, U.S. Pat. No. 4,682,028 to create a histogram of the image signal. When a histogram of an image signal is created, the characteristics of the corresponding radiation image recorded on a recording medium such as a stimulable phosphor sheet or X-ray film can be ascertained based on, for example, the maximum value of the image signal, the minimum value of the image signal, or the value of the image signal at which the histogram is maximum, i.e. the value which occurs most frequently. Therefore, if the read-out conditions for the final readout, such as the read-out gain or the scale factor, and/or the image processing conditions are based on an analysis of the histogram of the image signal, it becomes possible to reproduce a visible radiation image which has good image quality and can serve as an effective tool in, particularly, the efficient and accurate diagnosis of an illness.

Also, in the course of recording a radiation image, it is often desirable for portions of the object not related to a diagnosis or the like to be prevented from being exposed to radiation. Further, when the object portions not related to a diagnosis or the like are exposed to radiation, the radiation is scattered by such portions to the portion that is related to a diagnosis or the like, and the image quality is adversely affected by the scattered radiation. Therefore, when a radiation image is recorded on the recording medium an irradiation field stop is often used to limit the irradiation field to an area smaller than the overall recording region of the recording medium so that radiation is irradiated only to that portion of the object, which is to be viewed, and part of the recording medium.

However, in cases where the read-out conditions for the final readout and/or the image processing conditions are calculated on the basis of the results of an analysis of the image signal in the manner described above and the image signal is detected from a recording medium, on which the irradiation field was limited during the recording of the radiation image, the radiation image cannot be ascertained accurately if the image signal is analyzed without the shape and location of the irradiation field being taken into consideration. As a result, incorrect read-out conditions and/or an incorrect image processing conditions are set, and it becomes impossible to reproduce a visible radiation image which has good image quality and can serve as an effective tool in, particularly, the efficient and accurate diagnosis of an illness.

In order to eliminate the aforesaid problem, it is necessary to determine the shape and location of an irradiation field and then to calculate the read-out conditions for the final readout and/or the image processing conditions on the basis of only the image signal representing image information stored in the region inside of the irradiation field.

Accordingly, the applicant has proposed in, for example, U.S. patent application No. 182,685 a novel method for accurately determining the shape and location of an irradiation field even when the irradiation field has an irregular shape. The proposed method comprises the steps of detecting a contour point, which is considered to be present on the contour of the irradiation field, on each of a plurality of radial lines each of which connects a predetermined point located in the region inside of the irradiation field with an edge of a recording medium, and determining that the region surrounded by lines connecting the thus detected contour points is the irradiation field.

In the proposed method for determining the shape and location of an irradiation field, the aforesaid predetermined point should be located in the region inside of the irradiation field, and should preferably be located in an object image, which is formed in the region inside of the irradiation field. In cases where the recording of a radiation image is carried out with an irradiation field stop, since the irradiation field stop is used to limit the irradiation field so that an image of only that portion of the object which is to be viewed is recorded, the image points in the region inside of the irradiation field (particularly, the image points at positions neighboring the center point of the irradiation field) are generally located in the region inside of the object image.

In cases where the shape and location of the irradiation field are first determined and then the image signal representing the image information recorded in the region inside of the detected irradiation field is analyzed in the manner as that described above, appropriate read-out conditions for the final readout and/or appropriate image processing conditions can be determined.

However, in order to determine the shape and location of an irradiation field with the method proposed in U.S. patent application No. 182,685, it is necessary to find an image point located in the region inside of the irradiation field (preferably, an image point located in the region inside of the object image).

One approach is to determine the center point of the recording medium as the image point located in the region inside of the irradiation field (an image point located in the region inside of the object image). For example, as shown in FIG. 5A, in cases where an irradiation field 2 is present at the center portion of a recording medium 1, the center point C of the recording medium 1 is one of the image points located in the region inside of the irradiation field 2. In most cases, the center point C of the recording medium 1 is one of the image points located in the region inside of an object image 3.

However, as shown in FIG. 5B, in cases where the irradiation field is deviated from the center point C of the recording medium 1, an image point in the region inside of the irradiation field 2 cannot be found with the aforesaid method. Also, as shown in FIG. 5C, in cases where the image recording was carried out without the irradiation field stop being used, all positions on the recording medium 1 including the center point C of the recording medium 1 are the image points located in the region inside of the irradiation field 2. However, in this case, no irradiation field stop was used, and the probability of the object image 3 being deviated from approximately the center point of the irradiation field 2 (which center point coincides with the center point C of the recording medium 1 in this example) is higher than when the image recording was carried out with the irradiation field being limited as shown in FIGS. 5A and 5B. Therefore, the center point C of the recording medium does not necessarily constitute one of the image points located in the region inside of the object image.

The image point located in the region inside of the object image should be determined when the shape and location of the irradiation field are to be recognized as described above, and when which position on a radiation image is to be employed as the center point of a visible image is determined in cases where, for example, part of the radiation image is enlarged and reproduced into the visible image.

SUMMARY OF THE INVENTION

The primary object of the present invention is to provide a method for determining an image point in an object image included in a radiation image which has been recorded with or without an irradiation field stop.

The present invention provides a first method for determining an image point in an object image, which comprises the steps of:

i) on the basis of an image signal made up of a series of image signal components representing respective picture elements in a radiation image, which includes an object image and which has been recorded on a recording medium (such as a stimulable phosphor sheet or photographic film), finding the center of gravity on said recording medium by weighting the respective picture elements with corresponding absolute values of differentiated values resulting from the carrying out of differentiation processing on the image signal values corresponding to the respective picture elements, and ii) determining a position, at which said center of gravity is located, as the image point in said object image.

The present invention also provides a second method for determining an image point in an object image, which comprises the steps of:

i) on the basis of an image signal made up of a series of image signal components representing respective picture elements in a radiation image, which includes an object image and which has been recorded on a recording medium (such as a stimulable phosphor sheet or photographic film), arraying absolute values of differentiated values resulting from the carrying out of differentiation processing on the image signal values corresponding to the respective picture elements such that the positions of said absolute values of differentiated values coincide with the positions of the corresponding picture elements, ii) cumulating said absolute values of differentiated values along each of two different directions on said recording medium, and plotting the resulting cumulative values of s id absolute values of differentiated values along each of said two different directions, thereby to find the distributions of the cumulative values along two different said directions, iii) detecting a coordinate point along each of two different said directions, for which point the cumulative value is approximately one half of the maximum cumulative value, from each of said distributions of the cumulative values, and iv) determining a position on said recording medium, which position is defined by the coordinate points detected along two different said directions, as the image point in said object image.

The first and second methods for determining an image point in an object image in accordance with the present invention may be modified such that the image signal value corresponding to the picture element, which corresponds to said position determined as the image point, is compared with a predetermined value corresponding to a predetermined image density, and said image point is judged as being a true image point in said object image in cases where said image signal value is larger than the predetermined value. With this modification, an image point in an object image can be determined more accurately.

The term "image signal made up of a series of image signal components representing respective picture elements in a radiation image" as used herein embraces, for example, an image signal obtained from a read-out operation wherein a stimulable phosphor sheet having a radiation image stored thereon is exposed to stimulating rays, which cause the stimulable phosphor sheet to emit light in proportion to the amount of energy stored thereon during its exposure to radiation, and the emitted light is detected photoelectrically. This term also embraces an image signal obtained from a read-out operation wherein light which has passed through photographic film or is reflected therefrom is detected photoelectrically.

The term "image signal values" as used herein means the values of the image signal components representing the respective picture elements.

With the first method for determining an image point in an object image in accordance with the present invention, the center of gravity on the recording medium is found by weighting the respective picture elements with corresponding absolute values of differentiated values resulting from the carrying out of differentiation processing on the image signal values corresponding to the respective picture elements. Therefore, a position at which the center of gravity is located can be determined with a substantially high probability as the image point in the object image.

With the second method for determining an image point in an object image in accordance with the present invention, absolute values of differentiated values resulting from the carrying out of differentiation processing on the image signal values corresponding to the respective picture elements are arrayed such that the positions of the absolute values of differentiated values coincide with the positions of the corresponding picture elements. The absolute values of differentiated values are cumulated along each of two different directions on the recording medium. The resulting cumulative values of the absolute values of differentiated values are then plotted along each of the two different directions. In this manner, the distributions of the cumulative values along the two different directions are found. Thereafter, a coordinate point along each of the two different directions, for which point the cumulative value is approximately one half of the maximum cumulative value, is detected from each of the distributions of the cumulative values. Therefore, a position on the recording medium, which position is defined by the coordinate points detected along the two different directions, can be determined with a substantially high probability as the image point in the object image.

In general, the image density in the region inside of an object image is higher than the density in the region outside of the object image. Therefore, in the first and second methods for determining an image point in an object image in accordance with the present invention, the image signal value corresponding to the picture element, which corresponds to the position determined as the image point, may be compared with a predetermined value corresponding to a predetermined image density. In cases where said image signal value is larger than the predetermined value, the image point may be judged as being a true image point in the object image. In this manner, an image point in an object image can be determined more accurately.

DESCRIPTION OF THE PREFERRED EMBODIMENTS

The present invention will hereinbelow be described in further detail with reference to the accompanying drawings.

Figure 1:
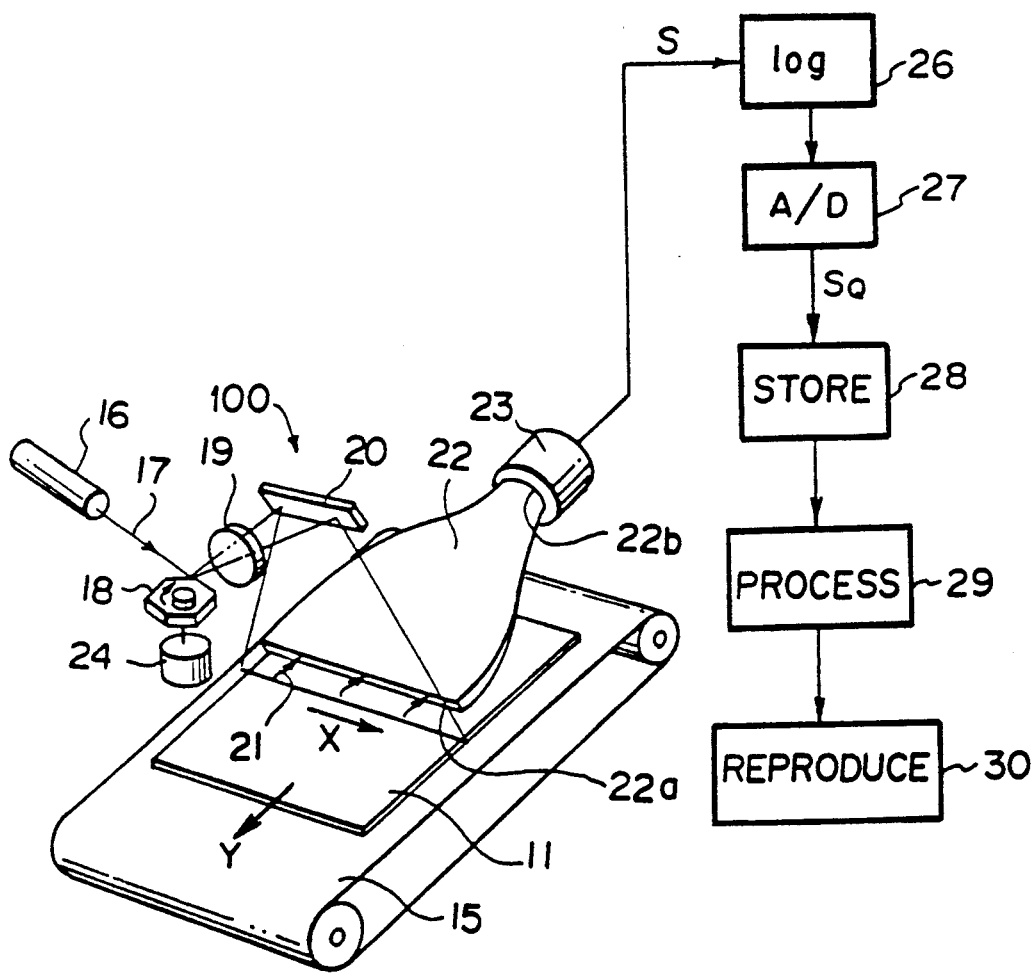
FIG. 1 is a perspective view showing an example of the radiation image read-out and reproducing apparatus wherein an embodiment of the method for determining an image point in an object image in accordance with the present invention is employed.

With reference to FIG. 1, a radiation image read-out and reproducing apparatus, wherein an embodiment of the method for determining an image point in an object image in accordance with the present invention is employed, utilizes a stimulable phosphor sheet.

A stimulable phosphor sheet 11, on which a radiation image has been stored, is placed at a predetermined position in a read-out means 100. The stimulable phosphor sheet 11 is conveyed in a sub-scanning direction indicated by the arrow Y by a sheet conveyance means 15, which is constituted of an endless belt or the like and which is operated by an operating means (not shown). A laser beam 17 is produced by a laser beam source 16 and is reflected and deflected by a rotating polygon mirror 18, which is being quickly rotated by a motor 24 in the direction indicated by the arrow. The laser beam 17 then passes through a converging lens 19, which is constituted of an fθ lens or the like. The direction of the optical path of the laser beam 17 is then changed by a mirror 20, and the laser beam 17 is caused to impinge upon the stimulable phosphor sheet 11 and scan it in a main scanning direction indicated by the arrow X. The main scanning direction is approximately normal to the sub-scanning direction indicated by the arrow Y. When the stimulable phosphor sheet 11 is exposed to the laser beam 17, the exposed portion of the stimulable phosphor sheet 11 emits light 21 in an amount proportional to the amount of energy stored thereon during its exposure to radiation. The emitted light 21 is guided by a light guide member 22, and photoelectrically detected by a photomultiplier 23. The light guide member 22 is made from a light guiding material, such as an acrylic plate. The light guide member 22 has a linear light input face 22a, positioned to extend along the main scanning line on the stimulable phosphor sheet 11, and a ring-shaped light output face 22b, positioned so that it is in close contact with a light receiving face of the photomultiplier 23. The emitted light 21, which has entered the light guide member 22 from its light input face 22a, is guided through repeated total reflection inside of the light guide member 22, emanates from the light output face 22b, and is received by the photomultiplier 23. In this manner, the amount of the emitted light 21, which amount represents the radiation image, is converted into an electric signal by the photomultiplier 23.

An analog output signal S generated by the photomultiplier 23 is logarithmically amplified by a logarithmic amplifier 26, and digitized by an A/D converter 27 into an image signal SQ which is made up of a series of image signal components representing the picture elements of the radiation image. The image signal SQ thus obtained is stored in a storage means 28, and then read therefrom by an image processing means 29.

The image processing means 29 determines an image point located in the object image. Along each of a plurality of radial lines, each of which extends from the determined image point to an edge of the stimulable phosphor sheet 11, the image processing means 29 detects a contour point, which is considered to be present on a contour of the irradiation field on the stimulable phosphor sheet 11. The contour point is detected from the image signal components of the image signal SQ, which represent the picture elements located along each line. Thereafter, the image processing means 29 detects the region surrounded by the lines, which connect the contour points thus detected, as the irradiation field. After finding the shape and location of the irradiation field in this manner, the image processing means 29 carries out appropriate image processing on the image signal SQ corresponding to the region inside of the irradiation field.

After being image processed, the image signal SQ is fed into a reproduction means 30 which reproduces a visible image from the image signal SQ.

How the image processing means 29 determines the image point in the object image on the basis of the image signal SQ will be described hereinbelow.

For simplicity of explanation, the values of the image signal components of the image signal SQ will hereinbelow be also denoted by SQ. The image processing means 29 finds the center of gravity on the stimulable phosphor sheet 11 by weighting the respective picture elements with corresponding absolute values of differentiated values resulting from the carrying out of differentiation processing o the image signal values SQ corresponding to the respective picture elements. A position, at which the center of gravity is located, is determined as an image point in the object image.

In order to find the center of gravity on the stimulable phosphor sheet 11, the image processing means 29 carries out differentiation processing on the image signal values SQ, which represents respective picture elements corresponding to positions located along a single direction or along each of two directions on the stimulable phosphor sheet 11. Differentiated values SQ' resulting from the differentiation processing are found in this manner, and absolute values $|SQ'|$ of the differentiated values SQ' are then found. Thereafter, the respective picture elements corresponding to the positions on the stimulable phosphor sheet 11 are weighted with corresponding absolute values $|SQ'|$ of the differentiated values SQ'. The center of gravity on the stimulable phosphor sheet 11 is found from the values resulting from the weighting.

Figure 2A:
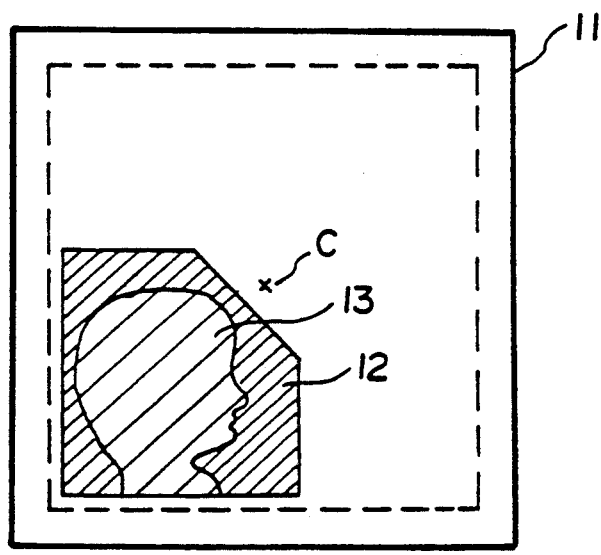
FIG. 2A is a schematic view showing an example wherein radiation was irradiated to a narrow area on a stimulable phosphor sheet.
Figure 2B:
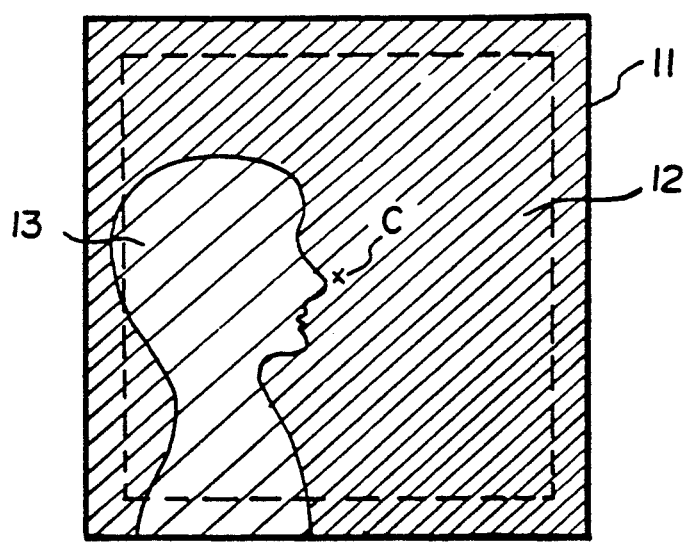
FIG. 2B is a schematic view showing an example wherein radiation was irradiated to the overall area on a stimulable phosphor sheet.

FIG. 2A is a schematic view showing an example wherein the image recording was carried out with an irradiation field stop, and radiation was irradiated only to a narrow area on a stimulable phosphor sheet 11. FIG. 2B is a schematic view showing an example wherein the image recording was carried out without an irradiation field stop being used, and radiation was irradiated to the overall area on a stimulable phosphor sheet 11.

In FIG. 2A, the region outside of an irradiation field 12 was exposed to little radiation, and therefore the image signal values SQ representing the picture elements located in said region are very small. In each of FIGS. 2A and 2B, upon the region outside of an object image 13, which region is located in the region inside of the irradiation field 12, the radiation impinged directly without passing through the object (or without being reflected by the object). Therefore, the image signal values SQ representing the picture elements located in the region outside of the object image 13, which region is located in the region inside of the irradiation field 12, are very large. The region inside of the object image 13 was exposed to the radiation which has passed through the object. Therefore, the image signal values SQ representing the picture elements located in the region inside of the object image 13 take middle values.

In each of FIGS. 2A and 2B, differentiation processing is carried out on the image signal values SQ representing the respective picture elements located on the stimulable phosphor sheet 11. The differentiated values SQ' are found from the differentiation processing, and the absolute values $|SQ'|$ of the differentiated values SQ' are then found. Thereafter, the center of gravity on the stimulable phosphor sheet 11 is found by weighting the respective picture elements with corresponding absolute values $|SQ'|$ of the differentiated values SQ'.

Figure 3A:
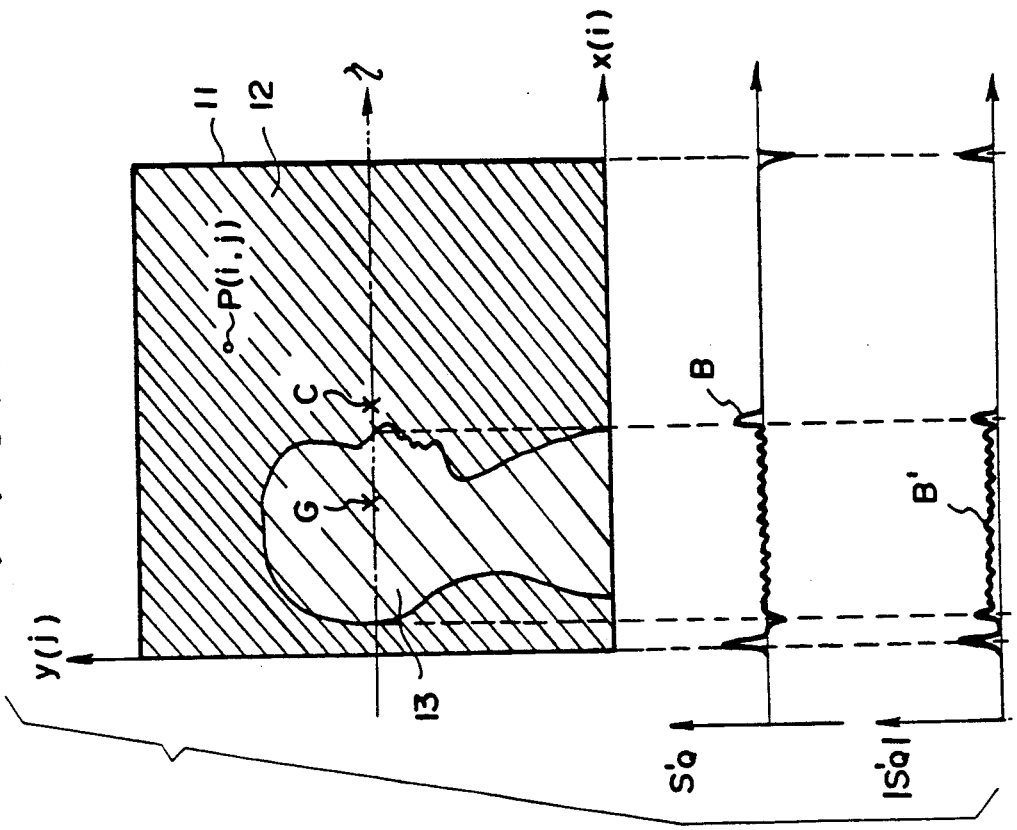
FIG. 3A is an explanatory view showing an example of a radiation image, a graph of differentiated values SQ' resulting from the carrying out of differentiation processing on image signal values SQ representing the radiation image, and a graph of absolute values |SQ'| of the differentiated values SQ'.
Figure 3B:
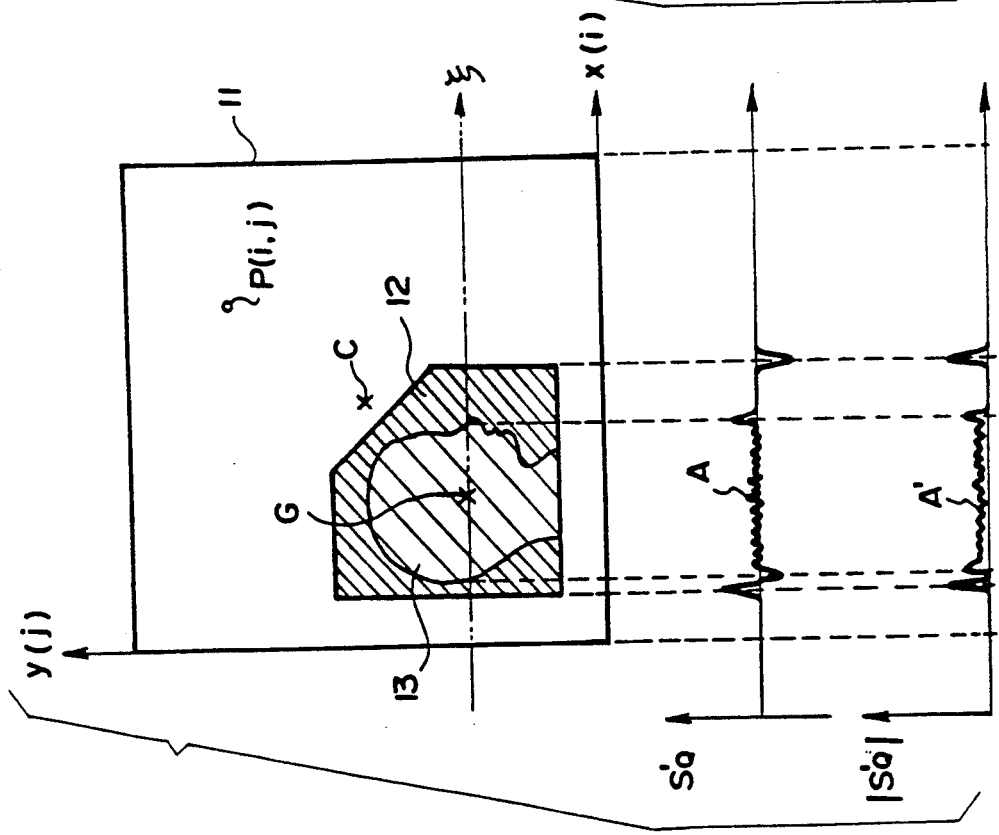
FIG. 3B is an explanatory view showing another example of a radiation image, a graph of differentiated values SQ' resulting from the carrying out of differentiation processing on image signal values SQ representing the radiation image, and a graph of absolute values |SQ'| of the differentiated values SQ'.

FIG. 3A is an explanatory view showing the radiation image of FIG. 2A, a graph of the differentiated values SQ' resulting from the carrying out of differentiation processing on the image signal values SQ representing the radiation image, and a graph of the absolute values $|SQ'|$ of the differentiated values SQ'. FIG. 3B is an explanatory view showing the radiation image of FIG. 2B, a graph of the differentiated values SQ' resulting from the carrying out of differentiation processing on the image signal values SQ representing the radiation image, and a graph of the absolute values $|SQ'|$ of the differentiated values SQ'.

FIG. 3A corresponds to the radiation image shown in FIG. 2A wherein the irradiation field 12 is formed only in a small area on the stimulable phosphor sheet 11. Curve A is obtained when the differentiation processing is carried out on the image signal values SQ, which represents respective picture elements corresponding to positions located along the straight line $\xi$, and the differentiated values SQ' resulting from the differentiation processing is plotted. Curve A' represents the absolute values $|SQ'|$ of the differentiated values SQ'. As indicated by curve A', the absolute values $|SQ'|$ of the differentiated values SQ' are large for the picture elements corresponding to edges of the irradiation field 12 and edges of the object image 13. Therefore, the center of gravity G on the stimulable phosphor sheet 11 is found by weighting the respective picture elements with the corresponding absolute values $|SQ'|$ of the differentiated values SQ'. The position, at which the center of gravity G is located, can be determined as the image point in the region inside of the irradiation field 12. As described above, the irradiation field stop was used to limit the irradiation field such that an image of only that portion of the object which is to be viewed is recorded. Therefore, the position at which the center of gravity G is located ca be determined with a substantially high accuracy as the image point in the object image 13.

FIG. 3B corresponds to the radiation shown in FIG. 2B wherein the irradiation field 12 extends over the whole area of the stimulable phosphor sheet 11. Curve B is obtained when the differentiation processing is carried out on the image signal values SQ, which represents respective picture elements corresponding to positions located along the straight line $\eta$, and the differentiated values SQ' resulting from the differentiation processing is plotted. Curve B' represents the absolute values $|SQ'|$ of the differentiated values SQ'. As indicated by curve B', the absolute values $|SQ'|$ of the differentiated values SQ' are large for the picture elements corresponding to edges of the stimulable phosphor sheet 11 and edges of the object image 13. Therefore, the center of gravity G on the stimulable phosphor sheet 11 is found by weighting the respective picture elements with the corresponding absolute values $|SQ'|$ of the differentiated values SQ'. The position, at which the center of gravity G is located, can be determined as the image point in the object image 13. In this case, the image point in the object image 13 can be determined more accurately when the differentiated values SQ' corresponding to the edges of the stimulable phosphor sheet 11 are omitted from the operations.

Specifically, the operations described below are carried out in order to find the center of gravity on the stimulable phosphor sheet 11 by weighting the respective picture elements with the corresponding absolute values |SQ'| of the differentiated values SQ' resulting from the carrying out of the differentiation processing on the image signal values SQ.

The coordinates of the picture elements corresponding to positions located along the x direction are denoted by i (positive integers). The coordinates of the picture elements corresponding to positions located along the y direction are denoted by j (positive integers). The absolute values of the differentiated values corresponding to the picture elements having the coordinates (i,j) are denoted by |P(i,j)|. Also, Px(j) and Py(i) are expressed as $$Px(j) = \sum_i |P(i,j)| \quad (1)$$

$$Py(i) = \sum_j |P(i,j)| \quad (2)$$

The coordinates of the center of gravity along the x direction and the center of gravity along the y direction are denoted respectively by xc and yc. Then, the coordinates (xc,yc) of the center of gravity are calculated with the formulas expressed as $$xc = \frac{\sum_i i \cdot Py(i)}{\sum_i Py(i)} \quad (3)$$

$$yc = \frac{\sum_j j \cdot Px(j)}{\sum_j Px(j)} \quad (4)$$

Alternatively, instead of carrying out the aforesaid operations for finding the center of gravity on the stimulable phosphor sheet 11, the image processing means 29 shown in FIG. 1 may carry out the operations described below. Specifically, the absolute values of the differentiated values resulting from the carrying out of differentiation processing on the image signal values SQ corresponding to the respective picture elements are arrayed such that the positions of the absolute values of differentiated values coincide with the positions of the corresponding picture elements. The absolute values of the differentiated values are accumulated along each of two different directions (the x and y directions in this example) on the recording medium. The resulting cumulative values of the absolute values of the differentiated values are then plotted along each of the x and y directions. In this manner, the distributions of the cumulative values along the x and y directions are found. Thereafter, a coordinate point xc' along the x direction is detected, for which point the cumulative value is approximately one half of the maximum cumulative value, from the distribution of the cumulative values along the x direction. Also, a coordinate point yc' along the y direction is detected, for which point the cumulative value is approximately one half of the maximum cumulative value, from the distribution of the cumulative values along the y direction. A position having the coordinates (xc',yc') on the recording medium, which position is defined by the coordinate points xc' and yc' detected along the x and y directions, is determined as the image point in the object image.

Figure 4:
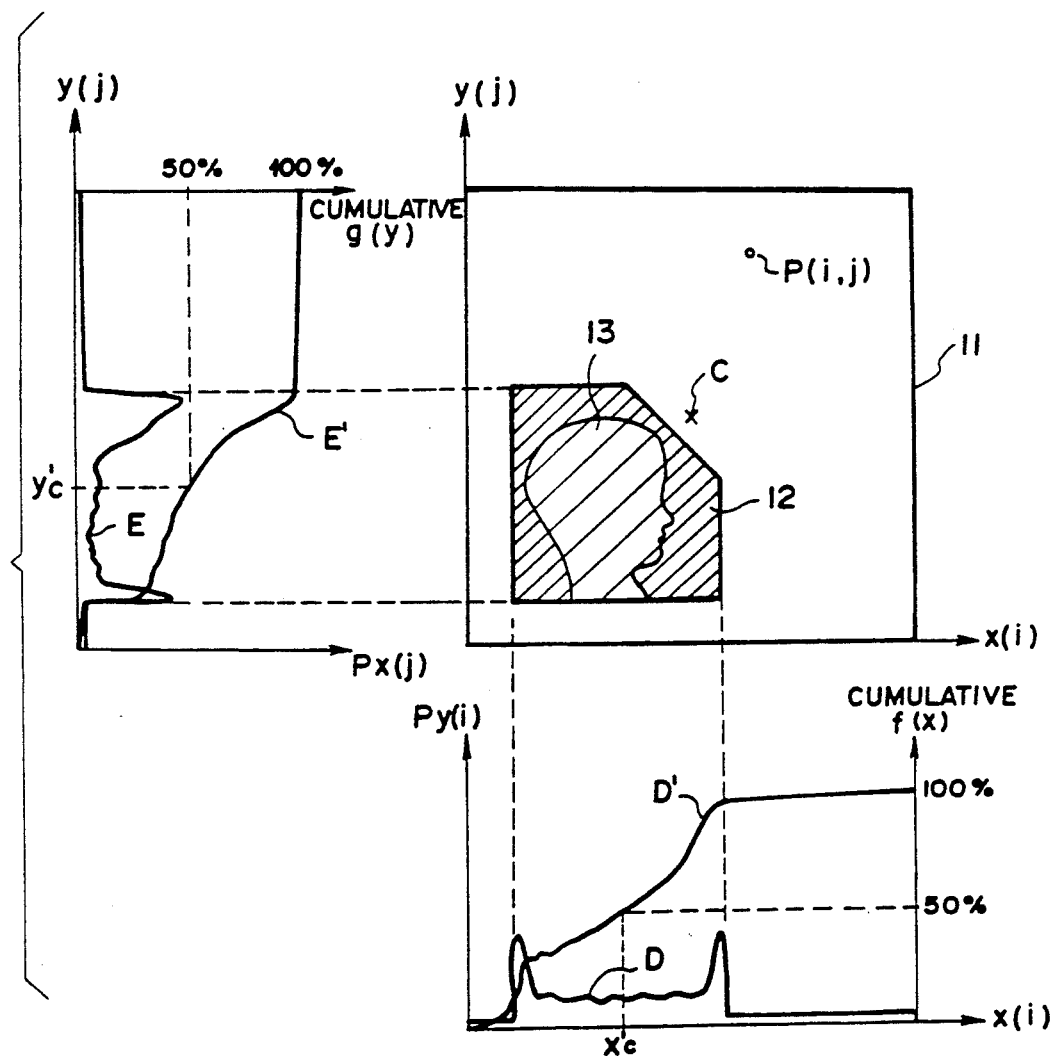
FIG. 4 is an explanatory view showing examples of the distributions of the absolute values of differentiated values resulting from the carrying out of differentiation processing on image signal values along the x and y directions, and the distributions of the cumulative values of the absolute values of differentiated values along the x and y directions.
Figure 5A:
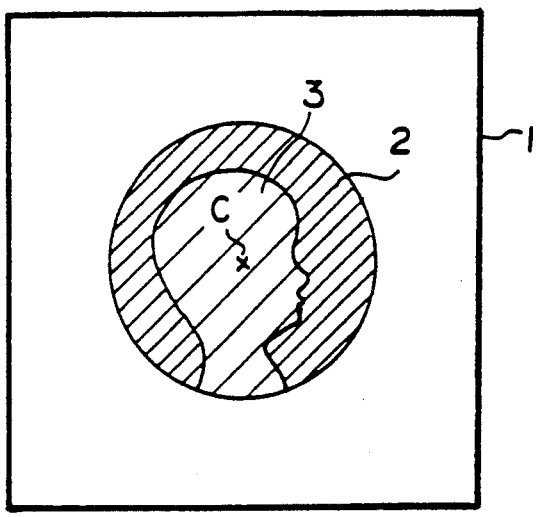
FIG. 5A is a schematic view showing an example wherein the irradiation field is located at the center portion of a recording medium.
Figure 5B:
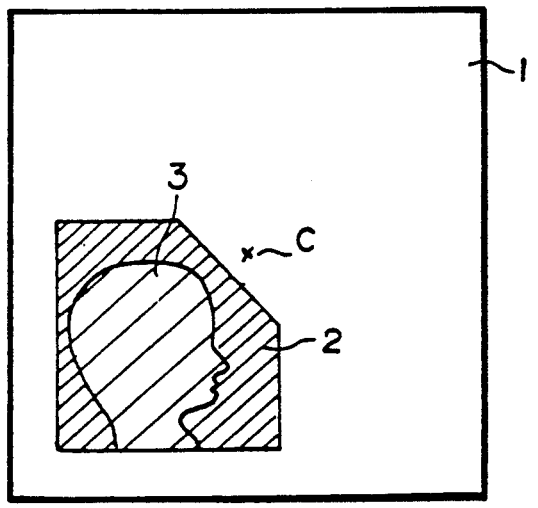
FIG. 5B is a schematic view showing an example wherein the irradiation field is deviated from the center portion of a recording medium.
Figure 5C:
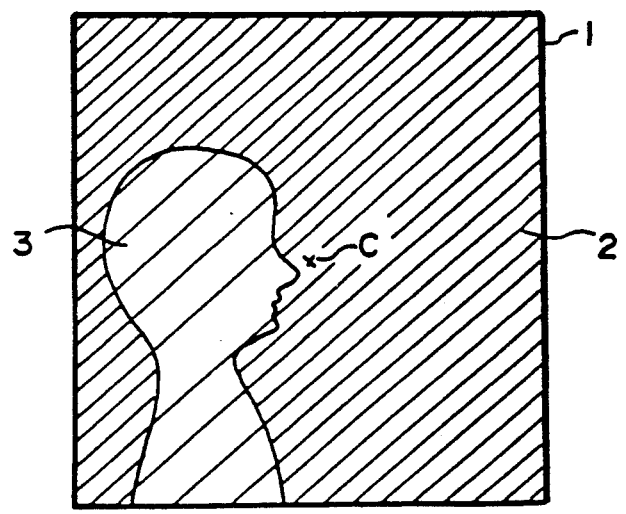
FIG. 5C is a schematic view showing an example wherein a radiation image was recorded without an irradiation field stop being used and the irradiation field extends over the overall area of a recording medium.

The aforesaid operations will hereinbelow be described with reference to FIG. 4. FIG. 4 is an explanatory view showing examples of the distributions of the absolute values of the differentiated value resulting from the carrying out of differentiation processing on the image signal values along the x and y directions. FIG. 4 also shows the distributions of the cumulative values of the absolute values of the differentiated values along the x and y directions.

With reference to FIG. 4, the absolute values of the differentiated values resulting from the carrying out of differentiation processing on the image signal values SQ, which have been selected in the manner described above and which correspond to the picture elements having the coordinates (i,j), are denoted by |P(i,j)|.

Curve D indicates the values which are expressed as $$Py(i) = \sum_j |P(i,j)|$$

and plotted along the x direction (i direction). Curve E indicates the values which are expressed as $$Px(j) = \sum_i |P(i,j)|$$

and plotted along the y direction (j direction). Curve D' indicates the cumulative values (%) obtained from the cumulation of the values Py(i), which are indicated by curve D, along the x direction. Curve E' indicates the cumulative values (%) obtained from the cumulation of the values Px(j), which are indicated by curve E, along the y direction. Specifically, curves D' and D' indicate the values expressed as $$f(x) = \sum_{i=1}^{x} Py(i) / \sum_{\text{all } i} Py(i) \times 100 \quad (5)$$

$$g(y) = \sum_{j=1}^{y} Px(j) / \sum_{\text{all } j} Px(j) \times 100 \quad (6)$$

The coordinate points xc' and yc' along the x and y directions, respectively, are calculated with the formulas expressed as $$\sum_{i=1}^{x'} Py(i) = 0.5 \sum_{\text{all } i} Py(i) \quad (7)$$

$$\sum_{j=1}^{y'} Px(j) = 0.5 \sum_{\text{all } j} Px(j) \quad (8)$$

The coordinate point xc' coincides with the point xc' shown in FIG. 4 at which the value of curve D' reaches 50%. The coordinate point yc' coincides with the point yc' shown in FIG. 4 at which the value of curve E' reaches 50%.

The position having the coordinates (xc',yc') found in the manner described above is determined as the image point in the object image.

Thereafter, judgment is made to find whether the image point in the object image, which has been determined in the aforesaid embodiments, is or is not a true image point in the object image (i.e. whether the image point has or has not been determined accurately or reliably). Specifically, the image signal value, P(xc',yc'), representing the picture element corresponds to the position having the coordinates (xc',yc'), which position has been determined as the image point in the manner described above, is compared with a predetermined value S1. The predetermined value S1 is substantially smaller than the image signal values SQ representing the picture elements in the object image 13 but is substantially larger than the image signal values SQ representing the picture elements corresponding to the position in the region outside of the irradiation field. In cases where the image signal value, P(xc',yc'), corresponding to the image point determined in the manner described above is larger than the predetermined value S1, the image point is judged as being a true image point in the object image.

The image point located in the object image is determined in the manner described above. Thereafter, along each of a plurality of radial lines, each of which extends from the determined image point to an edge of the stimulable phosphor sheet 11, the image processing means 29 detects a contour point, which is considered to be present on a contour of the irradiation field on the stimulable phosphor sheet 11. The contour point is detected from the image signal components of the image signal SQ representing the picture elements corresponding to positions located along each line. The image processing means 29 then detects the region surrounded by the lines, which connect the contour points thus detected, as the irradiation field. After finding the shape and location of the irradiation field, the image processing means 29 carries out appropriate image processing on the image signal SQ corresponding to the region inside of the irradiation field.

In the aforesaid embodiments, the determined image point in the object image is utilized to determine the shape and location of the irradiation field. However, the determined image point in the object image may be utilized for various other purposes. For example, when an object image was recorded at the peripheral part of the stimulable phosphor sheet 11, a visible image may be reproduced by the reproducing means 30 shown in FIG. 1 such that the object image is located at the center part of the visible image For this purpose, the image point in the object image determined by the image processing means 29 can be utilized.

In the aforesaid embodiments, no preliminary readout is carried out. However, the method for determining an image point in an object image in accordance with the present invention is also applicable when a preliminary readout is carried out for obtaining a preliminary read-out image signal, the shape and location of an irradiation field are detected from the preliminary read-out image signal, and the read-out conditions for the final read out are set on the basis of the preliminary read-out image signal corresponding to the region inside of the irradiation field.

The present invention is not limited to the aforesaid embodiments wherein a stimulable phosphor sheet is used, and is also applicable to, for example, X-ray image read-out apparatuses wherein conventional X-ray film is used.

Figure 6:
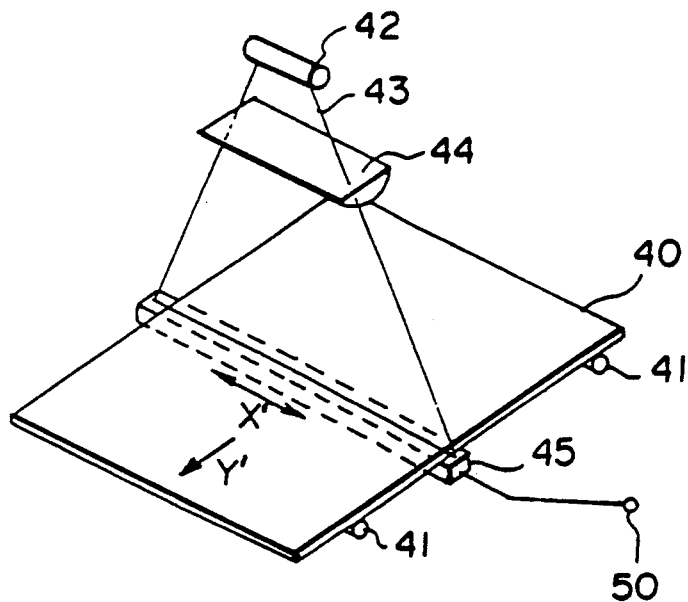
FIG. 6 is a perspective view showing an example of the X-ray image read-out apparatus wherein an X-ray image recorded on X-ray film is read out.

With reference to FIG. 6, a sheet of X-ray film 40, on which an X-ray image including an object image has been recorded, is placed at a predetermined position and is conveyed in the direction indicated by the arrow Y' by a film conveyance means 41.

Reading light 43, which is produced by an elongated light source 42 extending in one direction, is converged by a cylindrical lens 44. The reading light 43 is linearly irradiated onto the X-ray film 40 along the directions indicated by the double-headed arrow X', which are approximately normal to the direction indicated by the arrow Y'. A MOS sensor 45 is positioned below the X-ray film 40 so that the MOS sensor 45 can receive the reading light 43 which has passed through the X-ray film 40, the intensity of which light has been modulated in accordance with the X-ray image recorded on the X-ray film 40. The MOS sensor 45 comprises a plurality of solid state photoelectric conversion devices which are arrayed linearly at intervals equal to the intervals between the picture elements of the X-ray image along directions indicated by the double-headed arrow X'. As long as the X-ray film 40 is conveyed in the direction indicated by the arrow Y' while being exposed to the reading light 43, the MOS sensor 45 detects the reading light, which has passed through the X-ray film 40, at predetermined intervals corresponding to the intervals between the picture elements of the X-ray image along the direction indicated by the arrow Y'.

Figure 7:
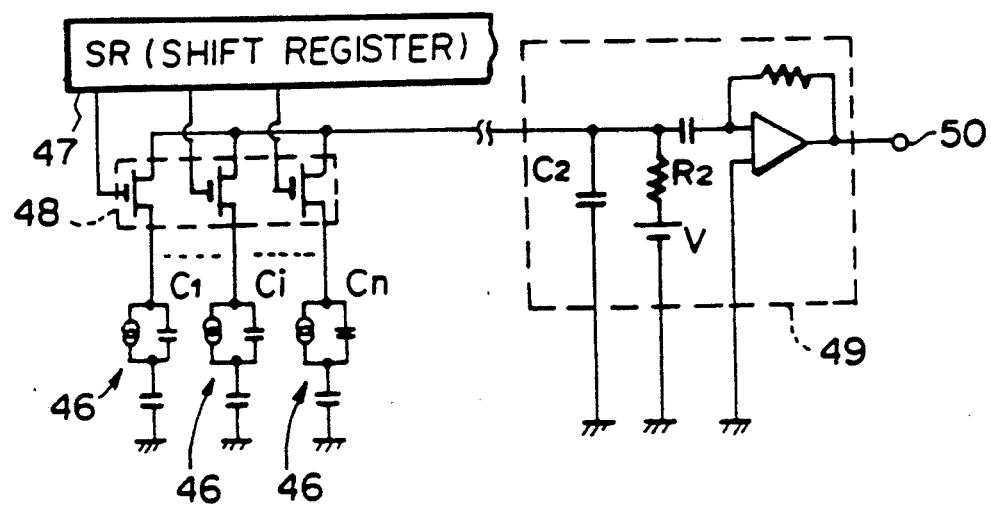
FIG. 7 is a circuit diagram showing an equivalent circuit for a MOS sensor.

FIG. 7 shows an equivalent circuit for the MOS sensor 45.

With reference to FIG. 7, photocarriers generated when the reading light 43 impinges upon the solid state photoelectric conversion devices 46, 46, ... accumulate in capacitors $C_i$ ($i = 1, 2, \ldots, n$) of the solid state photoelectric conversion devices 46, 46, ... The number of photocarriers, which have accumulated in the capacitors $C_i$, is detected by sequentially turning on and off the switches of a switch section 48. A shift register 47 controls the switches of the switch section 48, and a time-serial image signal is obtained. The image signal is then amplified by a pre-amplifier 49 and is output at an output terminal 50 of the pre-amplifier 49.

The analog image signal generated by the MOS sensor 45 is sampled and digitized into an image signal. Thereafter, the image point located in the object image is determined in the same manner as in the aforesaid embodiments, and the shape and location of the irradiation field are detected from the determined image point. In the embodiment shown in FIG. 6, the MOS sensor 45 may be replaced by a charge coupled device (CCD) or a charge priming device (CPD). Also, the X-ray image may be read out from the X-ray film 40 by two-dimensionally scanning the X-ray film 40 with a light beam in the same manner as that described above for the image readout from a stimulable phosphor sheet. Furthermore, instead of detecting light which has passed through the X-ray film 40, light reflected by the X-ray film 40 may be detected.

The method for determining an image point in an object image in accordance with the present invention is applicable to various types of radiation image read-out and reproducing apparatuses wherein an image signal is obtained by reading out a radiation image of an object from a recording medium, on which the radiation image has been recorded, and wherein a visible image is reproduced from the image signal.

I claim:

1. A method of selecting an image point of an object image recorded on a recording medium, said selected image point representing a center of gravity of said object image and said object image being constituted of a plurality of picture elements, the method comprising the steps of:

converting said picture elements into electrical signals representative of image values of said plurality of picture elements;

differentiating said electrical signals and producing differentiated signals having absolute values corresponding to said plurality of picture elements;

weighting each picture element of said object image with its corresponding absolute value produced in said differentiating step; and processing said weighted picture elements to obtain an average value thereof, wherein the center of gravity of said object image is represented by the picture element corresponding to said average value.

2. A method as defined in claim 1, further comprising the steps of comparing an image value of said electrical signal corresponding to the picture element representing the center of gravity of said object image to a predetermined image value corresponding to a predetermined image density, and judging said picture element corresponding to said average value as a true image point in said object image when said image value is larger than said predetermined image value.

3. A method as defined in claim 1, wherein said recording medium is a stimulable phosphor sheet for storing a radiation image.

4. A method as defined in claim 3, wherein said converting step comprises the steps of:

exposing said stimulable phosphor sheet to stimulating rays which cause said stimulable phosphor sheet to emit light in proportion to the amount of energy stored thereon during exposure to radiation; and photoelectrically detecting said light emitted from said stimulable phosphor sheet.

5. A method as defined in claim 4, wherein the steps of converting further comprising, prior to the steps of exposing and detecting, scanning said stimulable phosphor sheet to ascertain approximately the radiation image stored on said stimulable phosphor sheet.

6. A method as defined in claim 4, wherein said stimulating rays are produced by a laser medium.

7. A method as defined in claim 1, wherein said recording medium is a photographic film.

8. A method as defined in claim 1, wherein said processing step further comprises the step of summing said absolute values corresponding to said plurality of picture elements in each of two different directions across said object image.

9. A method as defined in claim 8, wherein said processing step further comprises the step of producing a summation of weighted picture elements in each of said two different directions across said object image, and dividing said summation with the result produced in said summing step, for each of said two different directions, to thereby produce the picture element representing the center of gravity of said object image.

10. A method of selecting an image point of an object image recorded on a recording medium, said selected image point representing a center of gravity of said object image and said object image being constituted of a plurality of picture elements, the method comprising the steps of:

converting said picture elements into electrical signals representative of image values of said plurality of picture elements;

differentiating said electrical signals and producing differentiated signals having absolute values corresponding to said plurality of picture elements;

producing an array of said absolute values such that positions in said array respectively correspond to said plurality of picture elements of said object image;

accumulating said absolute values along each of two different directions on said array, and plotting the resulting accumulated values along each of said two different directions so as to depict the distributions of said accumulated values along said two different directions; and detecting a coordinate point along each of said two different directions, for which point said accumulated value is approximately one-half of the maximum accumulated value, from each of said distributions of said accumulated values, wherein said image point is taken as the picture element corresponding to said coordinate points thus detected.

11. A method as defined in claim 10, further comprising the steps of comparing an image value of said electrical signal corresponding to the picture element representing the center of gravity of said object image to a predetermined image value corresponding to a predetermined image density, and judging said picture element corresponding to said average value as a true image point in said object image when said image value is larger than said predetermined image value.

12. A method as defined in claim 10, wherein said recording medium is a stimulable phosphor sheet for storing a radiation image.

13. A method as defined in claim 12, wherein said converting step comprises the steps of:

exposing said stimulable phosphor sheet to stimulating rays which cause said stimulable phosphor sheet to emit light in proportion to the amount of energy stored thereon during exposure to radiation; and photoelectrically detecting said light emitted from said stimulable phosphor sheet.

14. A method as defined in claim 13, wherein the steps of converting further comprising, prior to the steps of exposing and detecting, scanning said stimulable phosphor sheet to ascertain approximately the radiation image stored on said stimulable phosphor sheet.

15. A method as defined in claim 13, wherein said stimulating rays are produced by a laser medium.

16. A method as defined in claim 10, wherein said recording medium is a photographic film.

* * * * *